(12) United States Patent
Mercuri et al.

(10) Patent No.: US 7,232,601 B2
(45) Date of Patent: Jun. 19, 2007

(54) METHOD FOR PREPARING COMPOSITE FLEXIBLE GRAPHITE MATERIAL

(75) Inventors: Robert Angelo Mercuri, Seven Hills, OH (US); Jeremy Klug, Brunswick, OH (US); Matthew George Getz, Medina, OH (US); Thomas William Weber, Cleveland, OH (US)

(73) Assignee: Advanced Energy Technology Inc., Lakewood, OH (US)

( * ) Notice: Subject to any disclaimer, the term of this patent is extended or adjusted under 35 U.S.C. 154(b) by 0 days.

(21) Appl. No.: 09/871,243

(22) Filed: May 31, 2001

(65) Prior Publication Data

US 2002/0182387 A1    Dec. 5, 2002

(51) Int. Cl.
  *B32B 7/02* (2006.01)
  *B32B 9/00* (2006.01)
(52) U.S. Cl. ............ 428/212; 428/304.4; 428/402; 428/408; 423/448; 423/460
(58) Field of Classification Search ......... 428/212, 428/246, 365, 224, 408, 402, 304.4; 423/448, 423/460
See application file for complete search history.

(56) References Cited

U.S. PATENT DOCUMENTS

| | | | | |
|---|---|---|---|---|
| 2,800,616 A | | 7/1957 | Becker ............... 317/230 |
| 3,404,061 A | * | 10/1968 | Bochman et al. ...... 428/143 |
| 3,648,126 A | | 3/1972 | Boos et al. ........... 317/230 |
| 4,328,974 A | * | 5/1982 | White et al. .......... 277/308 |
| 4,729,910 A | | 3/1988 | Fukuda et al. ........ 427/294 |
| 4,895,713 A | | 1/1990 | Greinke et al. ....... 423/448 |
| 4,961,991 A | | 10/1990 | Howard ............... 428/246 |
| 5,192,605 A | | 3/1993 | Mercuri et al. ....... 428/224 |
| 5,240,769 A | | 8/1993 | Ueda et al. ........... 428/365 |
| 5,622,774 A | * | 4/1997 | Feldman et al. ....... 442/136 |
| 5,859,761 A | | 1/1999 | Aoki et al. ........... 361/502 |
| 5,902,762 A | | 5/1999 | Mercuri et al. ........ 501/99 |
| 6,094,788 A | | 8/2000 | Farahmandi et al. .... 25/25.41 |
| 2004/0241397 A1 | * | 12/2004 | Klug et al. ........... 428/195.1 |

OTHER PUBLICATIONS

WO 00/64808, Publication Date: Nov. 2, 2000, Intl Appln. No. PCT/US00/09402, Inventors: Mercuri et al.

\* cited by examiner

*Primary Examiner*—B. Hamilton Hess
*Assistant Examiner*—Lawrence D. Ferguson
(74) *Attorney, Agent, or Firm*—Waddey & Patterson; James R. Cartiglia

(57) ABSTRACT

An improved method enables preparation of articles for a variety of applications, including embossing or otherwise shaping to form a variety of articles. A plurality of thin, preferably resin-impregnated, flexible graphite sheets are arranged to form zones in a composite material having a graded density or other characteristic. Variation of properties between zones in the stock material formed is useful for achieving a desired set of properties in the formation of articles such as those useful in electrochemical fuel cells and double-layer capacitors.

7 Claims, 2 Drawing Sheets

METHOD FOR PREPARING COMPOSITE FLEXIBLE GRAPHITE MATERIAL

TECHNICAL FIELD

The invention relates to a material which can be used in preparing flexible graphite articles of controlled properties, such as density, to facilitate a further processing step. In a preferred form, the material will provide a stock material useful for embossing into a precise surface pattern or structure, while providing close tolerance control of important product characteristics. More particularly, the invention relates to methods and materials enabling the preparation of shaped elements having predetermined density gradation and/or detail necessary for their intended functions. The invention enables the achievement and control of density and/or structural definition such that performance per unit weight can be improved in an array of final products, at least some of which are useful as components in electrochemical supercapcitors and fuel cells.

BACKGROUND OF THE INVENTION

Electrochemical devices like supercapacitors and fuel cells are foreseen by some as necessary to the commercial realization of low-emission vehicles as well as a number of stationary power needs. Supercapacitors are useful for storing and releasing large bursts of energy, while fuel cells cleanly and efficiently convert suitable fuels to electrical energy. The unique advantages of each type of device make them, alone and together, promising for many power applications. In all cases, a balance must be struck between weight and performance, and it would be desirable to adjust manufacturing procedures of current construction materials to assure that both concerns are effectively addressed to provide a net improvement in the operation and/or economy of these devices.

The ability to design and produce key elements with consistent surface topography, density, electrical, thermal and strength characteristics depends on the provision of procedures and materials that enable close tolerance control. Tolerance control is of critical importance because tolerance variations can accumulate. It is desirable to establish procedures for treating materials that enable achieving target properties. Where this cannot be done, it is frequently necessary to compensate for out of tolerance regions during the design phase—leading to a less-than-ideal compromise on key structural and performance criteria. Often when a choice is made to add additional material in order to assure that minimum structural specifications are met, adds to the cost of the article being produced and decreases its effectiveness both per unit cost and per unit weight. In each instance where material distribution is altered to achieve improved thermal or electrical characteristics, other characteristics are affected and compromised. It would be desirable to enable more nearly meeting competing design criteria with close tolerance control.

Double-layer capacitors, sometimes also called ultracapacitors and supercapacitors, are capable of rapidly charging to store significant amounts of energy and then delivering the stored energy in bursts on demand. To be useful, they must, among other properties, have low internal resistance, store large amounts of charge and be physically strong per unit weight. There are, therefore, a large number of design parameters that must be considered in their construction. It would be desirable to enable procedures for producing starting materials for component parts that would address these concerns such that the final supercapacitor assembly could be more effective on a weight and/or cost basis.

Capacitors of the double-layer type generally include two porous electrodes, kept from electrical contact by a porous separator. Both the separator and the electrodes are immersed within an electrolyte solution. The electrolyte is free to flow through the separator, which is designed to prevent electrical contact between the electrodes and shorting of the cell. Current collecting plates are in contact with the backs of active electrodes. Electrostatic energy is stored in polarized liquid layers, which form when a potential is applied across the electrodes. A double layer of positive and negative charges is formed at the electrode-electrolyte interface.

The use of graphite electrodes in electrochemical capacitors with high power and energy density provides a number of advantages, but economics and operating efficiency are in need of improvement. Fabrication of double layer capacitors with carbon electrodes is known. See, for example, U.S. Pat. No. 6,094,788, to Farahmandhi, et al., U.S. Pat. No. 5,859,761, to Aoki, et al., U.S. Pat. No. 2,800,616, to Becker, and U.S. Pat. No. 3,648,126, to Boos, et al. The art has been utilizing graphite electrodes—but not flexible graphite sheets—for capacitors of this type for some time and is still facing challenges in terms of material selection and processing.

A continuing problem in many carbon electrode capacitors, including double-layer capacitors, is that the performance of the capacitor is limited because of the internal resistance of the carbon electrodes. While the use of carbon in the form of flexible graphite sheet has several advantages, it is desired to further reduce cell internal resistance. Internal resistance is influenced by several factors, including the high contact resistance of the internal carbon-carbon contacts, the contact resistance of the electrodes with a current collector, the surface and internal pore structure of the carbon and the material thickness. Because high resistance translates to large energy losses in the capacitor during charging and discharge, and these losses further adversely affect the characteristic RC (resistance×capacitance) time constant of the capacitor and interfere with its ability to be efficiently charged and/or discharged in a short period of time, it would be desirable to provide construction materials and methods that would facilitate reductions in the internal resistance.

Material selection and processing problems are also prevalent in the field of fuel cells, where construction of flow field plates (FFP's) and gas diffusion layers (GDL's) have been made of flexible graphite foil has been suggested due to an overall favorable combination of physical and electrical properties. Among the fuel cells utilizing this type of construction are ion exchange membrane fuel cells. Of these, proton exchange membrane (PEM) fuel cells are of particular interest. Cells of this type produce electricity through the chemical reaction of hydrogen with oxygen from the air. Within the fuel cell, electrodes denoted as anode and cathode, surround an ionically-conducting polymer (performing the function of an electrolyte) to form what is generally referred to as a membrane electrode assembly (or MEA). In some cells, the electrode component will also function as a GDL. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell is advantageously formed of a membrane electrode assembly sandwiched between two graphite flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes.

In operation of one of these PEM cells, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which join with the protons migrating through the proton exchange membrane and the electrons through the circuit. The result is the generation of current and the formation of water. Since the membrane is an electrical insulator, the electrons cannot directly cross the membrane, but seek the least resistance and travel through an external circuit which utilizes the electricity before the electrons join the protons at the cathode. An air stream on the cathode side is one mechanism by which the water formed by combination of the hydrogen and oxygen can be removed. Combinations of such fuel cells are used in a fuel cell stack to provide the desired voltage.

One factor limiting the use of flexible graphite materials as components for PEM fuel cells is the definition of a pattern embossed on the flow field plates, which, if not desirably precise and regular, can create anomalies in fuel cell operation, by either permitting leaking of fluids, or not permitting sufficient fluid flow through the fuel cell. Aggravating this problem are several opposing problems. Among these, are the needs for overall structural integrity and for the surface opposed to the embossed surface to be relatively dense to reduce permeability. Thus, there is a need for a suitable structural material, which can readily be shaped at one surface to conform to the surface of an intricately-shaped mold and yet have another surface that is sufficiently dense as to be impermeable under the conditions of operation to yield an overall structure having desired characteristics in terms of electrical and thermal conductivity and the like.

To better understand the complexity of the above considerations, we present a brief description of graphite and the manner in which it is typically processed to form flexible sheet materials. Graphite, on a microscopic scale, is made up of layer planes of hexagonal arrays or networks of carbon atoms. These layer planes of hexagonally arranged carbon atoms are substantially flat and are oriented or ordered so as to be substantially parallel and equidistant to one another. The substantially-flat, parallel, equidistant sheets or layers of carbon atoms, usually referred to as graphene layers or basal planes, are linked or bonded together and groups thereof are arranged in crystallites. Highly-ordered graphite materials consist of crystallites of considerable size: the crystallites being highly aligned or oriented with respect to each other and having well ordered carbon layers. In other words, highly ordered graphites have a high degree of preferred crystallite orientation. It should be noted that graphites, by definition, possess anisotropic structures and thus exhibit or possess many characteristics that are highly directional, e.g. thermal and electrical conductivity and fluid diffusion. Sometimes this anisotropy is an advantage and at others it can lead to process or product limitations.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be chemically treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been chemically or thermally expanded and more particularly expanded so as to have a final thickness or "c" direction dimension which is as much as about 80 or more times the original "c" direction dimension, can be formed without the use of a binder into cohesive or integrated sheets of expanded graphite, e.g. webs, papers, strips, tapes, or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation. There is a need for processing that more fully takes advantage of these properties.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance will, once compressed, maintain the compression set and alignment with the opposed major surfaces of the sheet. The density and thickness of the sheet material can be varied by controlling the degree of compression.

Lower densities are often thought to be advantageous where surface detail requires embossing or molding. Lower densities aid in achieving good detail. However, strength, thermal conductivity and electrical conductivity are generally favored by more dense sheets. Typically, the density of the sheet material will be within the range of from about 0.04 g/cc to about 1.4 g/cc. It would be desirable to have a process that would enable varying densities as needed. Current technology does not lend itself easily to meet these challenges.

Flexible graphite sheet material made as described above typically exhibits an appreciable degree of anisotropy due to the alignment of graphite particles parallel to the major opposed, parallel surfaces of the sheet, with the degree of anisotropy increasing upon roll pressing of the sheet material to increased density. In roll-pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude typically, for the "c" and "a" directions.

This considerable difference in properties, i.e. anisotropy, is directionally dependent, and is in need of control for optimizing properties for many applications. In applications such as electrodes for fuel cells, it would be of advantage if the electrical resistance transverse to the major surfaces of the flexible graphite sheet ("c" direction) were decreased, and this might be achieved by utilizing sheets of higher density. However, high density sheets might inhibit effective embossing. And, the embossing (or other shaping) operation could cause further, undesirable variations in properties. It would be desirable to enable a process which provided for both.

Thermal properties, e.g., thermal conductivity, of a flexible graphite sheet in a direction parallel to the major surfaces of the flexible graphite sheet is relatively high, while it is relatively low in the "c" direction, transverse to the major surfaces. Again, it would be desirable to alter this property in a manner consistent with effective embossing.

Flexible graphite sheet can be provided with channels, which are preferably smooth-sided, and which pass between the parallel, opposed surfaces of the flexible graphite sheet and are separated by walls of compressed expanded graphite. When the flexible graphite sheet functions as an electrode in an electrochemical fuel cell, it is placed so as to abut the ion exchange membrane so that the "tops" of the walls of the flexible graphite sheet abut the ion exchange membrane. Thus, there are products requiring dense flat surfaces and embossed surfaces, product requirements presenting different demands on a flexible graphite sheet starting material having predictable properties that can be optimized for many articles of uniform construction but must be compromised in others.

There remains a need in the art for a material which can be used in preparing flexible graphite articles, particularly those that are embossed with particular patterns thereon and, especially, to methods and materials enabling the preparation of shaped elements having predetermined density gradation and/or detail necessary for their intended functions, thereby facilitating quality control while also, preferably improving performance per unit weight for the final articles produced. If available, such needed methods and materials would aid the formation of an array of final products, some of which are useful as components in electrochemical supercapcitors and fuel cells.

SUMMARY OF THE INVENTION

Accordingly, it is an object of the invention to provide a material that can be used in preparing a flexible graphite article that is embossed with a particular pattern thereon.

It is a more particular object of the invention to provide methods and materials enabling the preparation of shaped elements having predetermined characteristics, such as density gradation and/or detail.

It is another object of the invention to enable the production of a variety of shaped component parts having variations in density and/or detail necessary for their intended functions while facilitating quality control.

It is another object of the invention to provide a process for advantageously utilizing the anisotropic characteristics of flexible graphite sheet in the manufacture of shaped objects and preformed blanks for use in their production.

It is another specific object of the invention to provide materials and methods helpful in improving performance per unit weight for a variety of shaped articles useful as components in electrochemical supercapcitors and fuel cells.

It is another object of the invention to provide materials and methods which enable maintenance of high densities consistent with good thermal and electrical conductivity while permitting molding or shaping the materials with good detail.

It is yet another object of the invention to provide materials and methods which provide a more uniform distribution of graphite weight per unit area in a substrate for preparing a shaped component and the final component itself.

It is a still further object of the invention to provide materials and methods which enable molding and shaping of the materials in high detail while assuring good control of tolerances for product density, porosity, thickness and other characteristics.

These and other objects are accomplished by the present invention, which provides a material useful as a substrate for an embossed flexible graphite sheet and methods for preparing materials of this type.

The material of the invention is useful as a substrate for preparing articles such as an embossed flexible graphite sheet, the material comprising a composite flexible graphite sheet comprising a plurality of zones, e.g., layers, of flexible graphite sheet, at least one of which is preferably resin-impregnated, wherein: at least one of said plurality of zones has a characteristic, e.g., density and/or void condition or the like, distinct from at least one other of said plurality of zones. In some forms, the material will further include a layer of a diverse material, e.g., of a nonporous or foraminous material interposed between at least two layers of a plurality of layers. A nonporous sheet, foil or film can be employed for a useful purpose such as sealing or the like where it does not interfere with the end use. A foraminous material can be selected for any of a variety of added advantages and is typically one selected from the group consisting of perforated films and foils, and woven and nonwoven fabrics and webs. In one embodiment, at least one of said plurality of layers has a density higher of at least about 1.1 g/cc and at least one has a density higher of less than about 1.0 g/cc.

According to the process of the invention, composite materials useful for a number of purposes including as substrates for forming embossed flexible graphite articles are prepared to include a plurality of zones of resin-impregnated flexible graphite sheet, wherein at least one of said plurality of zones has a characteristic, e.g., density or void condition, distinct from at least one other of said plurality of zones. The process preferably comprising: placing a first layer of resin-impregnated flexible graphite sheet adjacent, e.g., on top of, at least one other layer of resin-impregnated flexible graphite sheet having a characteristic different from said first layer.

Many preferred and alternative aspects of the invention are described below.

BRIEF DESCRIPTION OF THE DRAWINGS

The present invention will be better understood and its advantages more apparent in view of the following detailed description, especially when read with reference to the appended drawings, wherein.

DETAILED DESCRIPTION OF THE INVENTION

Figure 1:
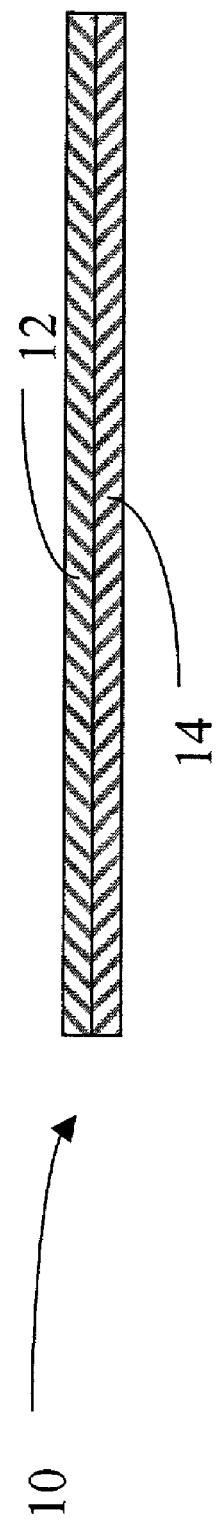
FIG. 1 is a schematic of a composite material useful for a number of purposes including as a substrates for forming embossed flexible graphite articles.

The invention will be illustrated and explained in this description by specific reference to the production of shaped elements suitable for use in electrochemical devices such as fuel cells of the PEM type and double-layer capacitors wherein a variation in physical properties in terms of density gradation and/or shaped detail is important. It will be recognized, however, that while this description is made for illustrative purposes, the invention has broader applicability and is useful in the production of materials for many other end uses.

Central to all of the embodiments of the invention is the provision of a material having of a plurality of zones, e.g., layers or partial layers, of flexible graphite sheet (also termed "foil") and providing for diversity of characteristics between the zones. By the term "zone" we refer to a defined volume, comprised of any vertically or horizontally-oriented, three-dimensional space filled with a graphite sheet material of one characteristic and bounded by a void (as at a top, bottom or side) or another graphite sheet or a diverse material (e.g., a nonporous or foraminous material). By the term "characteristic" we mean a measurable property or characterizing feature. Among the most common properties measured in the use of flexible graphite foil are: electrical conductivity, electrical resistivity, thermal conductivity, density, void condition, area weight, gas permeability, water permeability, particle size, type of graphite starting material, presence and composition of filler materials, degree of graphite intumescence, latent intumescence potential, the presence and composition of intercalation compounds, the presence and composition of residues, resin content and composition, degree of resin drying, degree of resin cure or cross-link and the like.

Suitable flexible graphite sheet material is commercially available in a variety of grades and thicknesses and densities for a variety of end uses. The preferred products will contain a suitable binder, and in others a binder will not be employed. These materials are available under the trademarks GRAFOIL® and GRAFCELL™ from Graftech, Inc. The sheet material, or at least one zone of it, is preferably impregnated with resin, such as an acrylic-, epoxy- or phenolic-based resin system, prior to shaping, such as by layering, with or without cutting, and then pressing with at least one shaping member, such as by embossing. Advantageously, the resin is cured during or after the step of shaping the flexible graphite sheet. The resin content of the resin-impregnated flexible graphite sheet material is preferably at least about 5%, and more preferably at least about 10%, by weight. In some cases, the material can be shaped or otherwise subjected to consolidating pressure and then impregnated.

In the course of this description, we will refer to flexible graphite sheet or foil, and we mean to use these terms interchangeably. The term "flexible graphite sheet" in this context is meant to refer to an article made of compressed, exfoliated graphite either by itself or with one or more fillers or binders, wherein parallel surfaces of particles of graphite are oriented principally in a plane perpendicular to the "c" direction of the graphite particles and the thickness of the article in the direction parallel to the "c" direction is less than about 1.5 mm. The invention will have particular advantage when dealing with thin sheets, namely those of less than about 1.0 mm in thickness. Sheets having thicknesses in the range of from about 0.05 to about 0.5 mm will have particular advantage for some applications. For others, thicknesses of from 0.2 to 0.75 mm will be preferred. In yet others the range can be a narrow low range of from about 0.075 to about 0.2 mm. The flexible graphite sheet material is preferably of low area weight, e.g., from about 0.001 to about 1.4 g/cm$^2$, to facilitate impregnation and subsequent handling in roll form. In some cases, area weights of less than 0.5, e.g., from 0.1 to 0.4, will be useful. In others area weights of from above 0.5 to 1.4, e.g., from 0.6 to 1.0, will be useful. Advantageously, thinner materials may be rolled into coils and transported as a continuous sheet rather than cut into pieces for shipment. This facilitates processing and saves material.

Briefly, before describing the invention in detail, reference is made to FIG. 1, which illustrates, schematically, a composite material 10 of the invention, useful for a number of purposes including as a substrate for forming embossed flexible graphite articles. The composite is made of a plurality of layers, here two layers, 12 and 14. However, the number of layers is not limited to two and up to ten or more layers can be employed to advantage. Indeed, an important aspect of the invention is that it provides an opportunity to improve the product through the reduction of variation in area weight. When randomly selected, the variation in a laminate will be reduced by the square root of the number of layers in the laminate, through deliberate selection, further improvements can be achieved. Impregnated and dried materials in a condition for embossing may be assembled to accumulate any desired target density. When then formed the assembled pieces will combine as one. With suitable selection in density for the layers of a laminate, the assembly will yield a more true representation of the die cavity and show fewer discontinuities resulting from shear during forming than would a single layer. For example, nine layers of 8-mg/cm$^2$ may be formed into a single 72-mg/cm$^2$ molding blank.

Figure 3:
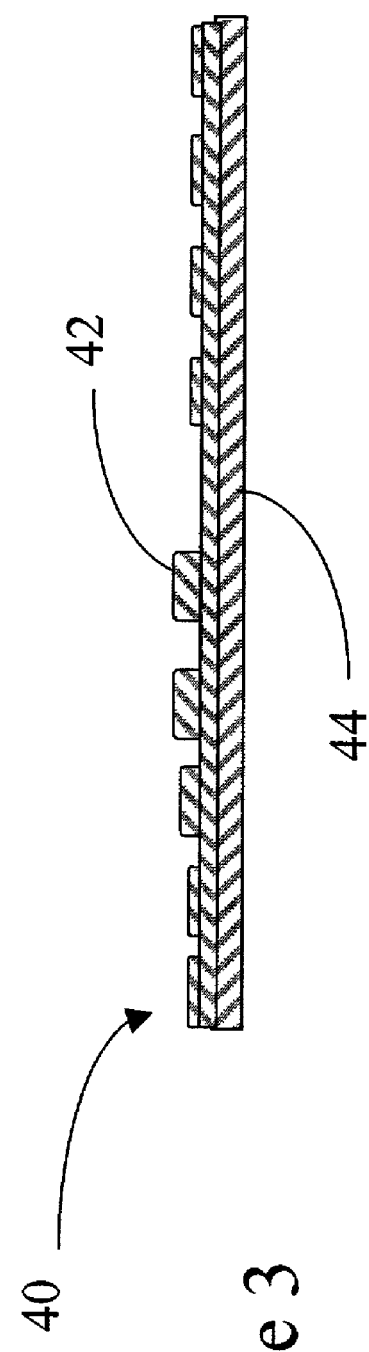
FIG. 3 is a cross-sectional view of a representative shaped article having one shaped surface and one flat surface as will be improved by the invention.
Figure 2:
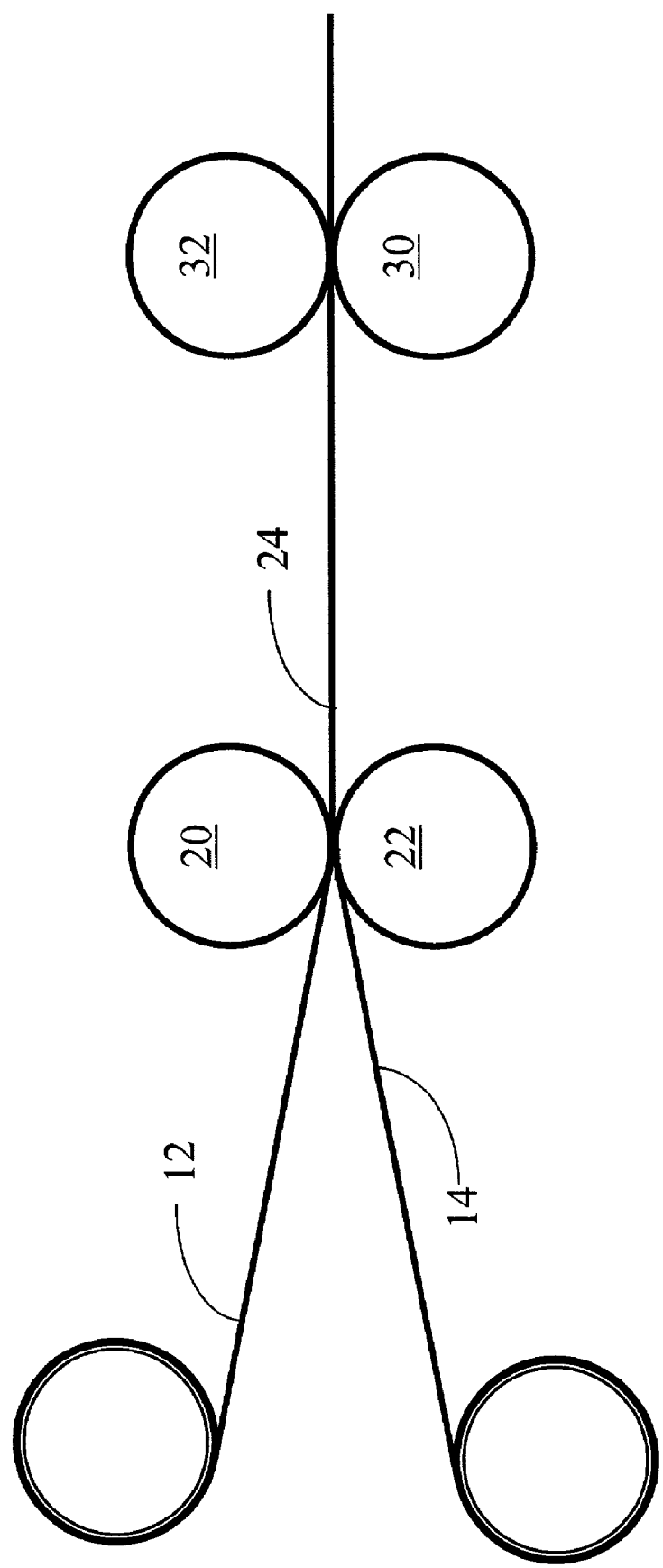
FIG. 2 is a schematic of a process for embossing a material as shown in FIG. 1.

A material of the type shown in FIG. 1 can be formed continuously from rolled sheets of resin-impregnated flexible graphite foil or by hand lay-up. In one automated process, as illustrated in FIG. 2, two sheets, 12 and 14, are brought together with contact pressure sufficient to promote substantial interfacial sheet contact by pressing between rollers 20 and 22. The resulting composite 24 can be distributed in this form as a roll or cut sheet. If desired, the composite can be pressed under sufficient pressure and heat, with or without the addition of additional binder or a solvent for a binder already present. The Figure shows the composite sheet material being directly fed to a shaping station wherein the sheet is supported against backing roller 30 where it is pressed by embossing roller 32 to provide a material as shown, for example, in FIG. 3. This Figure shows, as a cross-sectional view of a representative shaped article 40 having one shaped surface 42 and one flat surface 44. According to the invention, the proper selection of materials for the composite have enabled the density of the top surface 42 to be shaped with high conformance to the detail on the embossing roll 32, while the opposite surface 44 is smooth and dense.

For some applications, it can prove advantageous to use the lowest density layers of the laminate where the embossing detail is most critical and very high density where the surface is to be continuous. Other reasons for density variation also occur. Appropriate inter layers of suitable materials, such as nonreactive sheet material, such as a nonporous sheet, foil or film can be employed for a useful purpose such as sealing or the like where it does not interfere with the end use and in some cases will be perforated or expanded, such as an insert of mesh fabric can provide improved toughness, or conductivity and thus add value to the laminate.

Before describing the manner in which the invention improves current materials, a brief description of graphite and its formation into flexible sheets, which will become the component parts of the materials of the invention is in order.

Preparation of Flexible Graphite Foil

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be intercalated and exfoliated, is suitable for use with the present invention. Such graphite preferably has an ash content of less than 20% (weight), and for electrochemical uses less than 6% is often desired. More preferably, the graphite employed for the present invention will have a purity of at least about 94%. In the most preferred embodiment, the graphite employed will have a purity of at least about 99% for electrochemical fuel cell uses.

A common method for manufacturing graphite sheet is described by Shane et al in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. The intercalation solution may also contain metal halides such as ferric chloride, and ferric chloride mixed with sulfuric acid, or a halide, such as bromine, as a solution of bromine and sulfuric acid or bromine, in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1,10-decanediol, decylaldehyde, 1-propanol, 1,3-propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation.

In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 20 hours, with shorter heating periods, e.g., at least about 10 minutes, for higher temperatures in the above-noted range. Times of one half hour or less, e.g., on the order of 10 to 25 minutes, can be employed at the higher temperatures.

The thus treated particles of graphite are sometimes referred to as "particles of intercalated graphite." Upon exposure to high temperature, e.g. temperatures of at least about 160° C. and especially about 700° C. to 1000° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.05 mm to 4 mm and a typical density of about 0.1 to 1.4 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

Preparation of Resin-Impregnated Flexible Graphite Foil

The invention is facilitated by the use of resin-impregnated flexible graphite foils in at least one zone. To prepare it by impregnating before final consolidation into the material of the invention, flexible graphite sheet is treated with resin and if needed dried after absorption of the resin. This is a useful binder to ensure cohesiveness of the final product and, after consolidating or curing, enhances the fluid resistance and impermeability, improves the and handling strength, i.e. stiffness, of the flexible graphite sheet, as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, or mixtures thereof. Suitable epoxy resin systems include those based on diglycidyl ether of bisphenol A (DGEBA) and other multifunctional resin systems; phenolic resins that can be employed include resole and novolac phenolics. Typically, but not necessarily, the resin system is solvated to facilitate application into the flexible graphite sheet.

In a typical resin impregnation step, the flexible graphite sheet is passed through a vessel and impregnated with the resin system from, e.g. spray nozzles, the resin system advantageously being "pulled through the mat" by means of a vacuum chamber. The resin is thereafter preferably dried, reducing the tack of the resin and the resin-impregnated sheet, which has a starting density of about 0.1 to about 1.1 g/cc, can thereafter processed to change the void condition of the sheet.

One form of apparatus for continuously forming resin-impregnated and calendered flexible graphite sheet is shown in International Publication No. WO 00/64808, the disclosure of which is incorporated herein by reference.

It is an advantage of the invention that layers or other zones, e.g., partial layers such as precut inserts, can have void conditions differing in adjacent zones. By void condition is meant the percentage of the sheet represented by voids, which are generally found in the form of entrapped air. Generally, this is accomplished by the application of pressure to the sheet (which also has the effect of densifying the sheet) so as to reduce the level of voids in the sheet, for instance in a calender mill or platen press. Advantageously, the flexible graphite sheet is densified to a density of at least about 1.3 g/cc (although the presence of resin in the system can be used to reduce the voids without requiring densification to so high a level).

Preparation of Composite Graphite Materials

The invention provides a material useful as a substrate for an embossed flexible graphite sheet and comprises a composite flexible graphite sheet comprising a plurality of zones (e.g., layers or partial layers) of resin-impregnated, flexible graphite sheet. At least one of the plurality of zones has a characteristic different than at least one other of said plurality of zones. Among the various characteristics that are advantageously varied between zones according to the invention are all of those above or as may otherwise be measured and can be related to properties of a final shaped article or an effect on the process for making it. Typically, the invention can provide useful properties in the characteristics of final shaped articles when the difference in the characteristics referred to is greater than about 5%, and more typically from about 10% up to about 200%, based on the smaller of the two values. In many cases, differences of from about 20 to about 75% on this basis are valuable. In others difference values up to as much as 500% can have a particular utility.

In one form, the composite material of the invention will be provided with a unique combination of properties by further including a layer of a diverse material interposed between at least two layers of said plurality of layers. The diverse material can be a foraminous material, e.g., selected for any of a variety of added advantages and is typically one selected from the group consisting of perforated films and foils, and woven and nonwoven fabrics and webs of plastic, metal and/or natural composition. In all cases, the materials are employed to provide a unique ability to control final shaped article characteristics, e.g., density and surface properties, by preselecting layers of different characteristic, e.g., density or void condition, to comprise the layers of the composite. In other cases, the diverse material can be a nonporous film, sheet or foil of plastic or metal to aid in sealing and for other useful properties. By properly utilizing suitable inter layers with impregnated materials, an external binder can be eliminated, further decreasing electrical and thermal resistance.

Referring again to FIG. 1, a composite material 10 of the invention, is shown schematically, and is of type useful for a number of purposes including as a substrates for forming embossed flexible graphite articles. The composite is made of a plurality of layers, here two layers, 12 and 14. However, the number of layers is not limited to two, and up to ten or more layers can be employed to advantage. Indeed, an important aspect of the invention is the opportunity to improve the product through the reduction of variation in area weight. When randomly selected the variation in a laminate will be reduced by the square root of the number of layers in the laminate, through deliberate selection, further improvements can be achieved. Impregnated and dried materials in a condition for embossing may be assembled to accumulate any desired target density. When then formed the assembled pieces will combine as one. With suitable selection in density for the layers of a laminate, the assembly will yield a more true representation of the die cavity and show fewer discontinuities resulting from shear during forming than would a single layer. For example, nine layers of 8-mg/cm$^2$ may be formed into a single 72-mg/cm$^2$ molding blank.

A material of the type shown in FIG. 1 can be formed continuously from rolled sheets of resin-impregnated flexible graphite foil or by hand lay-up. In one automated process, as illustrated in FIG. 2, two sheets, 12 and 14 are brought together with contact pressure sufficient to promote substantial interfacial sheet contact by pressing between rollers 20 and 22. The resulting composite 24 can be distributed in this form as a roll or cut sheet. If desired, the composite 24 can be pressed under sufficient pressure and heat, with or without the addition of additional binder or a solvent for the binder already present.

In some cases, it will prove advantageous to use the lowest density layers of the laminate where the embossing detail is most critical and very high density where the surface is to be continuous. Appropriate inter layers of suitable materials, such as nonreactive sheet material, preferably perforated or expanded, or insert mesh fabric can provide improved toughness, or conductivity and thus add value to the laminate. Such materials, preferably foraminous in structure, can add useful properties to the final product and the material of the invention as well. These materials can add strength and/or enhance any of the above-noted characteristics for desired end uses. A nonporous sheet, foil or film can be employed for a useful purpose such as sealing or the like where it does not interfere with the end use.

The void condition, as with a variety of other characteristics of a flexible graphite sheet can be used advantageously to control and/or adjust the morphology and functional characteristics of one or more zones in a composite material of the invention, and, thus, the final embossed article. For instance, thermal and electrical conductivity, permeation rate and leaching characteristics can be affected and potentially controlled by controlling the void condition (and, usually, the density) of one or more zones extending in any desired direction, prior to embossing. Thus, if a set of desired characteristics of the final embossed article is recognized prior to manipulation of the void condition, the void condition can be tailored to achieve those characteristics, to the extent possible. By selecting a sheet of predetermined void condition as made in this manner or from a variety of sheets sorted by void volume or other characteristic after forming and testing, a composite material of the invention can be formed by laying-up, or cutting or otherwise shaping and then laying up, materials of different void condition or other characteristic such as densities, and thereby achieve zones of predetermined characteristics.

Most advantageously, especially when the final embossed article is intended for use as a component in an electrochemical fuel cell, a zone in a composite material requiring optimization of thermal and/or electrical conductivity, or the like, the resin-impregnated flexible graphite sheet can be manipulated so as to be relatively void-free. Generally, this can be accomplished by achieving a density of at least about 1.4 g/cc, more preferably at least about 1.7 g/cc, indicating a relatively void-free condition, which leads to production of an embossed article having a relatively high anisotropy ratio (potentially on the order of about 150 and higher).

In other cases, a composite material may be formed to facilitate flow during shaping to assure proper physical shape, the void condition will be selected to permit flow to the extent necessary with the final shaped material having a final void condition consistent with the electrical and thermal properties required. Where a low anisotropy ratio is desired, such as in certain thermal interface applications, a higher void condition density is preferred, which generally corresponds to a density in the range of about 1.1 to about 1.3 g/cc (again, depending on the presence/level of resin in the system).

The invention, rather than embossing a single sheet of graphite foil to achieve the desired properties, forms a composite material. FIG. 2 shows a composite sheet material 24 being directly fed to a shaping station wherein the sheet is supported against backing roller 30 where it is pressed by embossing roller 32 to provide a material 40 as shown, for example, in schematic cross section in FIG. 3. This Figure shows, as a cross-sectional view of a representative shaped article having one shaped surface 42 and one flat surface 44. According to the invention, the proper selection of materials for the composite have enabled the density of the top surface 42 to be shaped with high conformance to the detail on the embossing roll 32, while the opposite surface 44 is smooth and dense. In other arrangements, the materials forming the individual zones can be laid up in a stationary compression mold and pressed by moving the mold parts together to the desired extent in terms of pressure and/or separation.

The composite material of the invention as illustrated schematically in cross section in FIG. 1, is comprised of zones of different characteristics, being passed through an embossing apparatus. In the case of FIG. 1, the top layer 12 has a density suitable for some embossing applications, e.g., between 0.1 and 1.4 grams/cc, while the bottom layer 14 is relatively dense, e.g., from 1.4 to 1.8 grams/cc. Depending on the nature of the resin system employed, and especially the solvent type and level employed (which is advantageously tailored to the specific resin system, as would be familiar to the skilled artisan), a vaporization drying step may be included prior to the embossing step. In this drying step, the resin impregnated flexible graphite sheet is exposed to heat to vaporize and thereby remove some or all of the solvent, without effecting cure of the resin system. In this way, blistering during the curing step, which can be caused by vaporization of solvent trapped within the sheet by the densification of the sheet during surface shaping, is avoided. The degree and time of heating will vary with the nature and amount of solvent, and is preferably at a temperature of at least about 65° C. and more preferably from about 80° C. to about 95° C. for about 3 to about 20 minutes for this purpose.

The composite material can be used to create optimized morphological characteristics. By utilizing layers with different binder contents, relative flow levels can be changed, leading to preferential flow of certain layers to fill surface features on any embossing surface. The invention also provides a material useful in creating embossed materials without material sticking to the forming surfaces. By using formable surface layers with limited/zero resin content, surface definition can be obtained without adherence of the material to the embossing elements. This includes both platen press and continuous forming operations. This eliminates external and internal mold release agents, for example silicone release sprays, which may affect performance in the end-use environment.

An intermediate layer may comprise one or more layers of a foraminous material of any suitable construction and material. Typically it will be one selected from the group consisting of woven and nonwoven fabrics or webs, having any suitable structure of individual fibers or threads, films or foils, batts, knitted fabric, and the like, of any suitable metal, plastic or fiber of organic or inorganic composition. Nonwoven fabrics or webs can be formed from many processes such as for example, melt blowing processes, spin bonding processes, and bonded carded web processes. By definition, the foraminous material will permit the passage of a fluid from one surface through to the other. The material will have openings through it to facilitate this, but the size, shape and arrangement of the openings can be selected as desired for the final article characteristics. It is an advantage of the invention that foraminous materials of all kinds can be employed. Desirable foraminous materials will have integral means or shapes that facilitate mechanical or other physical bonding between the graphite layers and the foraminous layer or layers.

The resulting embossed graphite sheet can be used in a variety of applications, including as a component in an electrochemical fuel cell.

The following examples are presented to further illustrate and explain the invention and are not intended to be limiting in any regard. Unless otherwise indicated, all parts and percentages are by weight.

EXAMPLE 1

This example illustrates the production of a composite stock material, suitable for embossing to form fuel cell fluid flow field plates, and the like. Two sheets of resin impregnated graphite foil are provided. One consists of a material that has a thickness of 1.0 mm and a density of 0.75 grams/cc. The other has a thickness of 1.0 mm and a density of 1.0 grams/cc. The sheets are layered and then compressed between a pair of nip rolls spaced at 1.5 mm, with the result that the two sheets are consolidated into a single composite having zones of differing densities through thickness.

EXAMPLE 2

The procedure of Example 1 is repeated, but this time the first layer is 0.25 mm in thickness, has a density of 1.0 grams/cc and is not resin impregnated.

EXAMPLE 3

The procedure of Example 1 is repeated, but this time one of the layers is not a solid sheet but rather contains cut-out regions, in this one case, a frame of material. This allows for the creation of a single composite having zones of differing densities through thickness and in-plane.

EXAMPLE 4

The procedure of Example 1 is repeated, but this time a third layer, a copper 16-mesh woven copper screen is placed between the sheet of graphite foil and the nip of the rollers is set at a gap of 1.5 mm.

EXAMPLE 5

The procedure of Example 1 is repeated, but this time the first-mentioned of the sheets of graphite foil is replaced by an impregnated one including a_ceramic fiber_additive (see U.S. Pat. No. 5,902,762). The fiber containing layer provides for further manipulation of the anisotropy of the layers, allowing for greater design flexibility.

EXAMPLE 6

The procedure of Example 1 is repeated, but this time two layers of 0.25 mm copper foil are used to clad the resin impregnated graphite layers.

EXAMPLE 7

The procedure of Example 1 is repeated, but this time nine layers of 8-mg/cm$^2$ may be formed into a single 72-mg/cm$^2$ molding blank. When randomly selected, the variation in a laminate will be reduced by the square root of the number of layers in the laminate. They are subjected sufficiently to consolidate them sufficiently for handling prior to embossing, which will combine as one.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A material useful as a substrate for an embossed graphite article, the material comprising a composite of a plurality of graphite sheets which comprise compressed particles of exfoliated graphite, wherein at least one graphite sheet of said plurality has a density that differs by more than 5% from the density of a second graphite sheet of said plurality, the density of said one graphite sheet comprising between 0.1 g/cc up to 1.3 g/cc and the density of said second graphite sheet comprising at least 1.4 g/cc to no more than 1.8 g/cc, and further wherein said one graphite sheet comprises a top layer of said composite and said second graphite sheet comprises a bottom layer of said composite.

2. The material according to claim 1 wherein one graphite sheet of said plurality has a property other than density that differs by more than 5% from the property of a second graphite sheet of said plurality wherein said property comprises one selected from the group consisting of: electrical conductivity, thermal conductivity, void condition, area weight, gas permeability, water permeability, particle size, type of graphite starting material, presence and composition of filler materials, degree of graphite intumescence, latent intumescence potential, the presence and composition of intercalation compounds, the presence and composition of residues, resin content and composition, degree of resin drying, degree of resin cure or cross-link.

3. The material according to claim 1 wherein said property comprises resin content.

4. The material according to claim 1 wherein said property comprises void condition.

5. The material according to claim 1 wherein said composite comprises a second material, said second material comprises a nonporous material or a foraminous material.

6. The material according to claim 5 wherein said second material comprises an interlayer of said composite.

7. The material according to claim 1 wherein said difference comprises a value in the range of 10% up to 200%.

* * * * *